United States Patent
Zhao et al.

(10) Patent No.: US 8,010,778 B2
(45) Date of Patent: Aug. 30, 2011

(54) APPARATUS AND METHODS FOR NEGOTIATING A CAPABILITY IN ESTABLISHING A PEER-TO-PEER COMMUNICATION LINK

(75) Inventors: Meiyuan Zhao, Santa Clara, CA (US); Jesse R. Walker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 905 days.

(21) Appl. No.: 11/762,426

(22) Filed: Jun. 13, 2007

(65) Prior Publication Data

US 2008/0313698 A1 Dec. 18, 2008

(51) Int. Cl.
*H04L 29/06* (2006.01)
(52) U.S. Cl. ....................................... 713/150
(58) Field of Classification Search ................. None
See application file for complete search history.

(56) References Cited

U.S. PATENT DOCUMENTS

| | | |
|---|---|---|
| 7,107,051 B1 | 9/2006 | Walker |
| 7,219,223 B1 | 5/2007 | Bacchus et al. |
| 7,392,037 B2 | 6/2008 | Qi et al. |
| 7,394,800 B2 | 7/2008 | Sood et al. |
| 7,395,427 B2 | 7/2008 | Walker |
| 7,444,507 B2 | 10/2008 | Walker et al. |
| 7,457,953 B2 | 11/2008 | Walker et al. |
| 7,463,607 B2 | 12/2008 | Sood et al. |
| 2003/0093663 A1 | 5/2003 | Walker |
| 2004/0006705 A1 | 1/2004 | Walker |
| 2004/0259633 A1* | 12/2004 | Gentles et al. ............... 463/29 |
| 2005/0105739 A1 | 5/2005 | Ebihara et al. |
| 2005/0207581 A1 | 9/2005 | Qi et al. |
| 2005/0226175 A1 | 10/2005 | Gupta et al. |
| 2005/0243769 A1 | 11/2005 | Walker et al. |
| 2006/0053276 A1 | 3/2006 | Lortz et al. |
| 2006/0068758 A1* | 3/2006 | Dharmadhikari et al. .... 455/411 |
| 2006/0083200 A1 | 4/2006 | Emeott et al. |
| 2006/0093200 A1 | 5/2006 | Sharpe |
| 2006/0218398 A1 | 9/2006 | Sood et al. |
| 2006/0223526 A1 | 10/2006 | Qi et al. |
| 2006/0262932 A1 | 11/2006 | Sood et al. |
| 2006/0288204 A1 | 12/2006 | Sood et al. |
| 2007/0008903 A1 | 1/2007 | Sood et al. |
| 2007/0064660 A1 | 3/2007 | Qi et al. |
| 2007/0064661 A1 | 3/2007 | Sood et al. |
| 2007/0079362 A1 | 4/2007 | Lortz et al. |
| 2007/0097934 A1 | 5/2007 | Walker et al. |

(Continued)

FOREIGN PATENT DOCUMENTS

WO WO-2006124347 A 11/2006

(Continued)

OTHER PUBLICATIONS

"U.S. Appl. No. 11/762,442, Final Office Action mailed Dec. 9, 2010", 12 pgs.

(Continued)

*Primary Examiner* — Brandon S Hoffman
(74) *Attorney, Agent, or Firm* — Schwegman, Lundberg & Woessner, P.A.

(57) ABSTRACT

Apparatus and method to negotiate parameters of a policy in establishment of a peer-to-peer link are described herein. In an embodiment, a security policy is negotiated in establishment of a peer-to-peer link in a wireless mesh network.

17 Claims, 5 Drawing Sheets

U.S. PATENT DOCUMENTS

| | | |
|---|---|---|
| 2007/0104203 A1 | 5/2007 | Sood et al. |
| 2007/0110244 A1 | 5/2007 | Sood et al. |
| 2007/0121947 A1 | 5/2007 | Sood et al. |
| 2007/0124434 A1 | 5/2007 | Smith et al. |
| 2007/0156858 A1 | 7/2007 | Sood et al. |
| 2007/0192832 A1 | 8/2007 | Qi et al. |
| 2007/0206535 A1 | 9/2007 | Sood et al. |
| 2007/0224986 A1 | 9/2007 | Bakshi et al. |
| 2007/0239875 A1 | 10/2007 | Sood et al. |
| 2007/0263873 A1 | 11/2007 | Qi et al. |
| 2007/0264954 A1 | 11/2007 | Qi et al. |
| 2007/0266244 A1 | 11/2007 | Walker et al. |
| 2008/0005791 A1 | 1/2008 | Gupta et al. |
| 2008/0014882 A1 | 1/2008 | Tsai et al. |
| 2008/0065884 A1 | 3/2008 | Emeott et al. |
| 2008/0069067 A1 | 3/2008 | Sood et al. |
| 2008/0069348 A1 | 3/2008 | Walker et al. |
| 2008/0069351 A1 | 3/2008 | Walker et al. |
| 2008/0089331 A1 | 4/2008 | Metzler et al. |
| 2008/0313462 A1 | 12/2008 | Zhao et al. |
| 2009/0034443 A1 | 2/2009 | Walker et al. |
| 2009/0052674 A1 | 2/2009 | Nishida et al. |

FOREIGN PATENT DOCUMENTS

| | | |
|---|---|---|
| WO | WO-2008036694 A | 3/2008 |

OTHER PUBLICATIONS

"U.S. Appl. No. 11/762,442, Non-Final Office Action mailed Jun. 21, 2010", 11 pgs.

"U.S. Appl. No. 11/762,442, Response filed to Non Final Office Action mailed Sep. 21, 2010", 9 pgs.

"Chinese Application Serial No. 200810099693.9, Office Action mailed Dec. 27, 2010", 13 pgs.

"Chinese Application Serial No. 200810099693.9, Office Action mailed June 8, 2010", 13 pgs.

"European Application Serial No. 08153445.5, Examination Notification Art. 94(3) mailed Jan. 17, 2011", 3 Pgs.

"ISO/IEC 8802-11:2005", Information technology—Telecommunications and information exchange between systems—Local and metropolitan area networks—Specific requirements—Part 11: Wireless LAN Medium Access Control (MAC) and Physical Layer (PHY) specifications, (2005).

* cited by examiner

APPARATUS AND METHODS FOR NEGOTIATING A CAPABILITY IN ESTABLISHING A PEER-TO-PEER COMMUNICATION LINK

TECHNICAL FIELD

Embodiments of the invention relate generally to apparatus and methods for establishing a communication policy in a peer-to-peer link.

BACKGROUND

Communication networks may be structured with various architectural designs. In the design of many such communication networks, security is an integral component. As new designs for communication networks are developed, security should be addressed. However, implementation of security schemes includes processing and procedures that add delay and/or complexity to the desired transmission of content. The reduction of complexity or time to establish the security implementations in communication networks should be approached without degrading the quality of service in transmission through enhanced designs for communication networks.

BRIEF DESCRIPTION OF THE DRAWINGS

Embodiments of the invention are illustrated by way of example and not limitation in the figures of the accompanying drawings in which.

DETAILED DESCRIPTION

The following detailed description refers to the accompanying drawings that show, by way of illustration, details and embodiments in which the invention may be practiced. These embodiments are described in sufficient detail to enable those skilled in the art to practice embodiments of the present invention. Other embodiments may be utilized and structural, logical, and electrical changes may be made without departing from the inventive subject matter. The various embodiments disclosed herein are not necessarily mutually exclusive, as some embodiments can be combined with one or more other embodiments to form new embodiments. The following detailed description is, therefore, not to be taken in a limiting sense.

Figure 1:
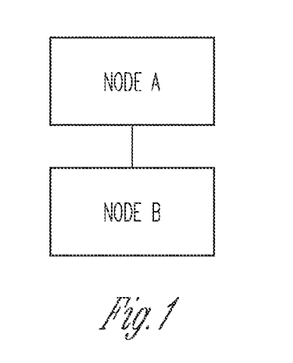
FIG. 1 shows a representation of an embodiment for a peer-to-peer communication link between node A and node B.

FIG. 1 shows a representation of an embodiment for a peer-to-peer communication link between node A and node B. In various embodiments, negotiation of a communication policy between node A and node B in the peer-to-peer configuration may be provided without relying on an announcement of information prior to the peer link establishment. A communication policy is a capability or function supported by an entity in which the capability or function may be accomplished by one or more mechanisms, protocols, or algorithms. The result of a negotiation includes selection of one of the mechanisms, protocols, or algorithms to conduct the function. An example of a communication policy is a security policy. The negotiation may be conducted during the peer link establishment using a predetermined criterion for determination of an arbitrator and a process for selection of the communication policy based on the arbitration criteria and the data provided in the peer link establishment.

Node A and node B are realized as independent electronic devices that can be given unique identifiers to identify each device among a larger set of devices. Each unique identifier can be arranged in a specific order based on the manner that generates each unique identifier or on the format for each unique identifier. A characteristic of the unique identifier may be used to define the predetermined criteria to create the arbitration used in the peer link establishment. For example, the arbitrator of the negotiation between node A and node B may be associated with the node having the largest unique identifier, if the identifier includes numeric characters or other unique symbols that can be quantified in terms of size. Alternatively, the arbitrator may be based on the smallest unique identifier. The predetermined criteria for determination of an arbitrator is not limited to the largest or smallest of a unique identifier correlated to nodes A and nodes B, but may be selected by other characteristics of a node, in which a unique feature for each node can be associated with the characteristic.

Given the predetermined criteria for the arbitrator, negotiation between node A and node B may be realized during the peer link establishment by node B providing node A with the unique identifier of node B and the set of parameters or values for the communication policy of node B and node A providing node B with the unique identifier of node A and the set of parameters or values for the communication policy of node A. Node A and node B each independently may use the predetermined criteria for the arbitrator, whose definitive characteristic is ascertained from the exchange of the unique identifiers, to select a negotiated parameter from the two sets of communication values (its own and the received set). The two sets may be compared and the arbitration criteria may be applied to comparison.

The application of the arbitration criteria to the two sets of communication parameters may be performed with each of the two sets being provided as ordered sets. The two ordered sets may be compared and the arbitration criteria may be applied to comparison taking into consideration an ordering rule. Once the parameter or value for the communication policy is independently determined, one or both of the nodes may provide a confirmation message to the other node communication that includes an indicator of the chosen value of the communication policy. If the indicator of the value of the communication policy received at a node is the same as the indicator of the value of the communication policy independently derived at the node, then the negotiation was successful. Such a process may be conducted with four messages exchanged. In an embodiment, the communication policy being negotiated may be a security policy.

The unique identifier and set of values of the communication policy may be transmitted between nodes A and B using a message integrity code, $m_K$, having an associated authentication key, K, and using a cryptographic random number generator. The authentication key is shared between node A and node B, where the shared nature of the authentication key may be established in a secure manner prior to the establishment of a peer link session between node A and node B. Node A may share a different authentication key with a node other than node B. Nodes A and B may be mesh points in a mesh communication network.

Figure 2:
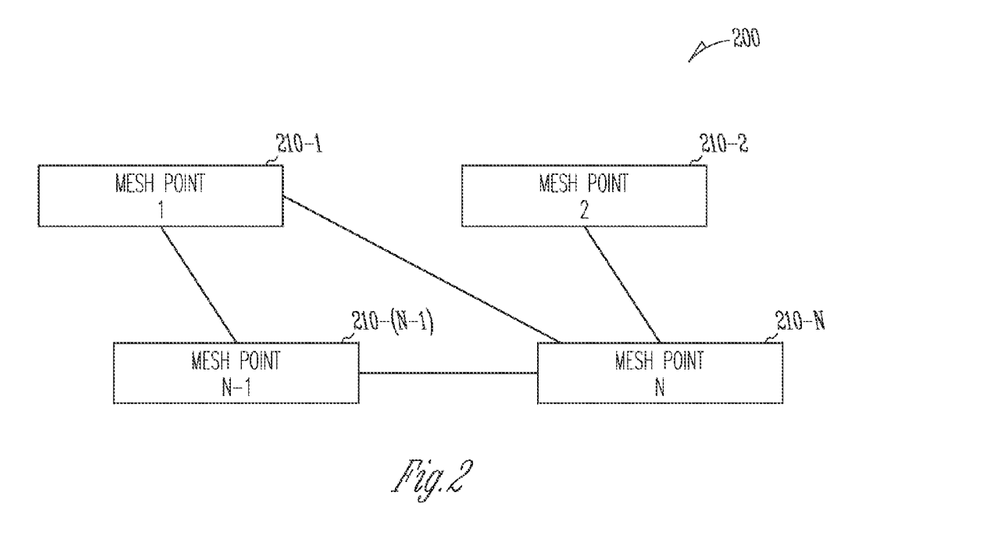
FIG. 2 shows features of an embodiment of a mesh network having a number of mesh points, where communication between two individual mesh points is established on a peer-to-peer basis.

FIG. 2 shows features of an embodiment of a mesh network 200 having a number of mesh points, 210-1 . . . 210-N, where communication between two individual mesh points is established on a peer-to-peer basis. The direct connectivity among mesh points 210-1 . . . 210-N may vary depending on the application. In various embodiments, a communication channel between mesh points 210-1 . . . 210-N on a pairwise basis may be provisioned according to network rules. Each mesh point 210-1 . . . 210-N has a unique identifier. The unique identifiers may be arranged in a hierarchical order based on a rule set.

Each mesh point 210-1 . . . 210-N has its own set of parameters or values for a communication policy. The members or values of the set at a mesh point may be arranged in a specific order. The specific order at each of the various nodes 210-1 . . . 210-N may be specific to the node. The specific order at the various nodes 210-1 . . . 210-N may be uncorrelated with respect to each other. Alternatively, the ordering of the communication parameters at each mesh point may be based on a common rule. In addition, the set of values at one mesh point may have a number of values in its set different from the number of values in the set of another mesh point. Further, the set of values for a communication policy at a mesh point may be fixed. Alternatively, the set of values of the communication policy may be provisioned at various times at the mesh point. During a peer-to-peer negotiation, the set of values at each negotiating mesh point may remain fixed at each mesh point.

Negotiation to establish a value for a communication policy in a point-to-point session between two different mesh points 210-I and 210-J, $1 \leq I$, $J \leq N$ may be conducted in a manner similar to that discussed above with respect to node A and node B in which a arbitration criteria, based on the unique identifiers of the mesh points 210-I and 210-J, are applied to the two sets of values for the communication policy of the two mesh points. The exchange of sets of values may be conducted for any pairwise combination of mesh points using a shared authentication key. A rule set may determine the manner in which the two sets of communication values are analyzed and the criteria applied. The mesh points may belong to a wireless mesh network.

Various standards for wireless communications are provided by the Institute of Electrical and Electronics Engineers (IEEE). An amendment, IEEE 802.11s, to the IEEE 802.11 standard, when completed, will add mesh capabilities to the wireless local area networking (WLAN) standard. The mesh architecture allows data to be forwarded on paths consisting of multiple wireless hops. IEEE 802.11s was chartered to improve the throughput of data transmission by adding the mesh capabilities without compromising security and without degrading quality of service (QoS) across transitions. This amendment may be used in applications that provide video streaming over the mesh.

However, video streams may expect that peer links on a mesh be established quickly, regardless of noise on a wireless fidelity (Wi-Fi) medium. As a result, there is concern regarding the completion of a secure peer link establishment process in the time available. To address this concern, protocols are being investigating that expedite the procedure of establishing secure peer links by overlaying security handshake on top of a basic peer link establishment protocol. Such a scheme permits wireless local area network (WLAN) Mesh Points (MPs) to omit certain steps in the secure link establishment process, if they have priori knowledge and control of a previously established pairwise master key (PMK). This approach may enhance user experience of video stream applications on the wireless mesh given that MPs frequently lose connectivity on certain links.

The IEEE 802.11s security enhancement of peer link establishment protocol introduces new security problems and performance challenges. A first step is to negotiate the security capabilities to enable unicast/multicast mesh traffic protection. For a link instance between two mesh points, both mesh points agree on the security parameters, such as the authentication method and the cryptographic algorithm, before they can complete the peer link establishment procedure. The authentication method and the cryptographic algorithm together are typically referred to as a ciphersuite. In IEEE 802.11i, the security amendment to IEEE 802.11 standard, the security parameter negotiation is performed using a client/server model, where the WLAN Access Point (AP) advertises the supported choices for each security parameter using a list of choices and the WLAN station (STA) chooses one from the list that it can support. A WLAN mesh may use the peer-to-peer model to establish links. However, the agreement method used by the client-server model may be unreliable unless the number of messages exchanged during link establishment is proportional to the length of the list.

A mechanism can be constructed based on an assumption that the mesh point that leads the security parameter negotiation has to learn the list of the choices announced by the peer MP prior to the peer link establishment protocol before it can initiate the protocol. Such a scheme assumes such announcement is conducted via a different mechanism, such as using Beacons/Probe Responses. However, in some cases, one node might identify another as a valid communications partner only by eavesdropping on the encrypted unicast traffic in its neighborhood. Such an MP will not be able to differentiate between Beacons and Probe Responses. In the wireless mesh environment, such a mechanism may not provide the protocol robustness desired in the peer-to-peer environment. Such a scheme may not meet an objective of providing better negotiation latency without reducing security.

In an embodiment, the negotiation of security parameters such as ciphersuites on top of a mesh four message link establishment protocol without sacrificing security is provided. Any MP may initiate the protocol at any time. Various embodiments may include two cryptographic primitives. First, a message integrity code may be used. The message integrity code is denoted as $m_K$, where K is an associated authentication key, and may be used to detect forged messages. Examples of suitable message authentication codes include codes in accordance with the advanced encryption standard (AES) in a cipher-based message authentication code algorithm (CMAC) mode and the secure hash algorithm 256 (SHA-256) in a Keyed-Hash Message Authentication Code (HMAC) mode, although embodiments of the invention are not limited in this respect. Second, a cryptographic random number generator, denoted as rng, may be used. A cryptographic random number generator may be used to produce values that cannot be predicted by any polynomial time algorithm. ANSI standards X9.31 and X9.82 provide examples of cryptographic random number generators. Other cryptographic random number generators may be used.

Figure 3:
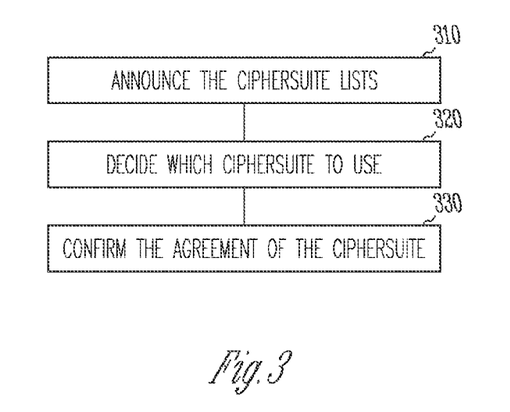
FIG. 3 shows a flow diagram of features of an embodiment of a method to negotiate a security policy between two mesh points on a mesh network.

FIG. 3 shows a flow diagram of features of an embodiment of a method to negotiate a security policy between two mesh points on a mesh network. The mesh points, parties in a network, may be electronic devices in the mesh network. In the following, the two mesh points are referenced as mesh point A and mesh point B. Both mesh point A and mesh point B include an identifier that is unique. Each identifier has a common characteristic or format that allows the selection of one of the identifiers based on some rule or criterion. Herein, the identifier for mesh point A is denoted as MPA and the identifier for mesh point B is denoted as MPB. The mesh point identifiers may be totally ordered. In an embodiment, the ordering may be based on the relative magnitude of one identifier with respect to the other identifier. This introduces a process to determine a "preferred party" in the peer to peer setting. For example, mesh point A's identifier may be larger in the ordering than B's identifier, and mesh point A can be taken by both mesh points to be the "preferred party." In an embodiment, the IEEE 802.11 medium access control (MAC) address of mesh point A may be a value for MPA, with the IEEE 802.11 MAC address of B being a value for MPB. The use of MAC addresses allows a fixed criterion to be used to select mesh A of mesh B based on a relative comparison of the MAC addresses, at a latter phase of the negotiation process.

Such a fixed rule is not limited to the two given mesh points A and B, but may apply to all the mesh points in the network. As an example, MAC addresses used as device identifiers can be totally ordered by ordering them lexicographically. Under this arrangement, since the MAC address uniquely identifies a device, one mesh point's MAC address will also be strictly larger than the other's with respect to the lexicographical order. At a latter phase of the negotiation process, comparing the two MAC address allows one or more features of one of the mesh points to be selected as an effective arbitrator. Rather than MAC addresses, other unique identifiers may be used.

Each mesh point in the network is in a state that it maintains. In an embodiment, the state maintained by mesh point A includes a totally ordered list, $L_A$, of acceptable parameter values, $C_{A1}, C_{A2}, \ldots, C_{AN}$, where N is the length of $L_A$. This ordered list of values $C_{A1}, C_{A2}, \ldots, C_{AN}$ identifies the parameter values that mesh point A supports. These parameters may be for unicast mesh traffic protection. The ordered list $L_A$ may have $C_{A1}$ as the parameter value most preferred by mesh point A, while its least preferred parameter value is $C_{AN}$. Alternatively, the ordered list $L_A$ may have $C_{AN}$ as the parameter value most preferred by mesh point A, while its least preferred parameter value is $C_{A1}$. In addition, mesh point A maintains a unique authentication key K that mesh point A shares with mesh point B, which is used to key the message authentication code $m_K$. This authentication key K allows the mesh point A to detect messages forged by devices masquerading as the mesh point B. Mesh Point A uses MPA to identify K to mesh point B.

The state maintained by mesh point B includes a totally ordered list, $L_B$, of acceptable parameter values, $C_{B1}, C_{B2}, \ldots, C_{BM}$, where M is the length of $L_B$. The ordered list $C_{B1}, C_{B2}, \ldots, C_{BM}$ identifies the parameter values that mesh point B supports. These parameters may be for unicast mesh traffic protection. The ordered list $L_B$ may have $C_{B1}$ as the parameter value most preferred by mesh point B, while its least preferred parameter value is $C_{BM}$. Alternatively, the ordered list $L_B$ may have $C_{BM}$ as the parameter value most preferred by mesh point B, while its least preferred parameter value is $C_{B1}$. In addition, mesh point B maintains the authentication key K shared with the mesh point A, which is used to key the message authentication code $m_K$. This authentication key K allows the mesh point B to detect messages forged by devices masquerading as the mesh point A. Mesh point B uses MPB to identify K to mesh point A.

The acceptable parameter values in list $L_A$ that are supported by mesh point A are configured to mesh point A in a provisioning prior to the execution of the security policy negotiation. The acceptable parameter values in list $L_B$ that are supported by mesh point B are configured to mesh point B in a provisioning prior to the execution of the security policy negotiation. The lists, $L_A$ and $L_B$, may be changed or updated at their respective mesh points during a period at which a security policy negotiation is not being conducted at the particular mesh point.

The authentication key K shared between mesh point A and mesh point B is established in some secure fashion. In an embodiment, authentication key K is bound to the MAC addresses of each party, which provides for both mesh point A and mesh point B to know that authentication key K is used for protecting messages exchanged between devices using their own identifiers. In various embodiments, authentication key K is used only for protecting messages exchanged between devices using their own identifiers.

At 310, ciphersuite lists from the two mesh points are announced. This portion of the embodiment of the process may be considered phase 1, in which both mesh points advertise their configured ciphersuites list to each other. This announcement can be accomplished by inserting their respective ordered lists of parameter values into the Request message in the peer link establishment protocol, where the message from each mesh point includes its identifier. A Request message may also be considered an Open message.

Figure 4:
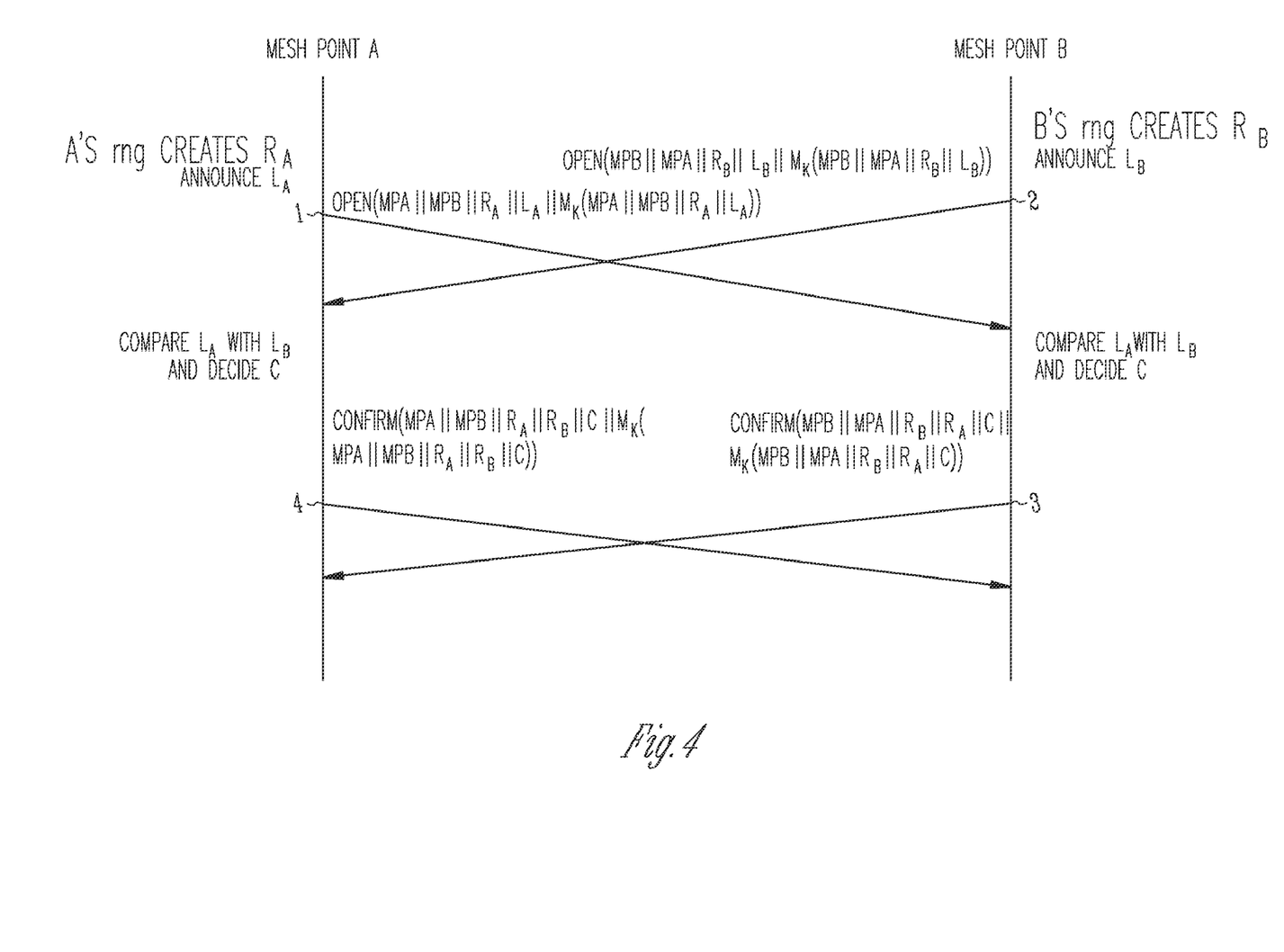
FIG. 4 illustrates an embodiment for message flows between two mesh points.

Mesh point A includes $L_A$ in its Request message and mesh point B includes $L_B$ in its Request message. Included in a request message is a random number. Mesh point A uses its rng to generate a random number $R_A$. Mesh point B uses its rng to generate a random number $R_B$. The request message from mesh point A and from mesh point B may be generated as follows:

A→B: MPA∥MPB∥$R_A$∥$L_A$∥$m_K$ (MPA∥$R_A$∥$L_A$)
B→A: MPB∥MPA∥$R_B$∥$L_B$∥$m_K$ (MPB∥$R_B$∥$L_B$), where "∥" means concatenation, A→B: M means mesh point A sends message M to mesh point B, and B→A: M means mesh point B sends message M to mesh point A. FIG. 4 illustrates an embodiment for message flows between two mesh points.

The protocol begins with the mesh point A generating $R_A$ and sending message 1 (Open Message), MPA∥MPB∥$R_A$∥$L_A$∥$m_K$(MPA∥MPB∥$R_A$∥$L_A$), to mesh point B. Including MPA in message 1 tells mesh point B which authentication key to use to construct the response by message 3. Including MPB in message 1 tells mesh point B that mesh point B is the target of the message. Including $R_A$ in the message 1 allows mesh point A to later verify that message 3 is fresh, that is, could not have been produced prior to message 1. Including $L_A$ in the message 1 allows mesh point B to make its decision based on the received ordered list $L_A$ and local ordered list $L_B$.

Simultaneously or sequentially, mesh point B generates a random number $R_B$ and sends message 2 (Open Message) as MPB∥MPA∥$R_B$∥$L_B$∥$m_K$ (MPB∥MPA∥$R_B$∥$L_B$). Similarly, mesh point B indicates the correct authentication key to use by including MPB in message 2 and indicates the message target by including MPA. Including $R_B$ in message 2 allows mesh point B to later verify that message 4 is fresh, that is, could not have been produced prior to message 2. Including $L_B$ in the message 2 allows mesh point A to make decision based on the received ordered list $L_B$ and its local ordered list $L_A$. Other sequencing may be used in the concatenations, where such sequencing is a known ordering to the two parties.

The first party checks that the random number $R_B$ received in the second request message is not equal to the random number $R_A$. If so, the first party discards the second request message and does not respond to it. Similarly, the first party verifies the message integrity code of the second request message by using the shared key. If this verification fails, then the first party discards the second request message and does not respond to it. Similarly, the second party checks that the random number $R_A$ received in the first request message is not equal to the random number $R_B$. If so, the second party discards the first request message and does not respond to it. Similarly, the second party verifies the message integrity code of the first request message by using the shared key. If this verification fails, then the second party discards the first request message and does not respond to it.

A peer link establishment protocol is used to establish peer links between mesh point A and mesh point B using Request and Response message exchanges. Both mesh points can initiate the protocol independently. In an embodiment, there are at least four messages exchanged during the protocol execution. At the end of the complete process, the peer link is established between mesh point A and mesh point B.

At 320, each mesh point independently makes a decision on which parameter value to select. This operation may be considered phase 2, deciding which ciphersuite to use. Once a mesh point receives a Request message, it can independently decide which parameter value to use. In an embodiment, preference is given to the list belonging to the device with the larger identifier. For example, with A's identifier MPA being larger in the ordering than B's identifier MPB, preference is given to A's list, $L_A$, from which to select the negotiated policy value. In the examples below, preference is given to A's list.

When mesh point B processes message 1, it uses K to check that the message authenticate code is valid. If so, then mesh point B selects the parameter value $C \epsilon L_A \cap L_B$ that is the largest value in mesh point A's ordering of the parameter values in $L_A \cap L_B$. As an example, suppose $L_A = \{X, Y, Z\}$ and $L_B = \{Z, P, Y\}$. Then B will select Y, because $L_A \cdot L_B = \{Y, Z\}$ and mesh point A has ordered Y before Z. Alternatively, the selection rule may have the preferred value in the ordering being the last of the order.

Similarly, when mesh point A processes message 2, the Open message from mesh point B, mesh point A uses K to check that the message authenticate code is valid. If so, then mesh point A selects the unique C such that $C \epsilon L_A \cap L_B$ is the largest value in its ordering of the set $L_A \cap L_B$. Alternatively, the selection rule may have the preferred value in the ordering being the smallest value in the ordering.

At 330, the agreement of the ciphersuite is confirmed. This operation may be considered phase 3, in which, mesh point A and mesh point B confirm the decision. The confirmation may be accomplished by inserting their selection into a Response message of the peer link establishment protocol. Mesh point B generates message 3 (a Response message that acts as a Confirm message in the process), to confirm its decision of C. Including both $R_B$ and $R_A$ in the message 3 allows mesh point A to verify that it is a fresh response. This Confirm message may be sent as B→A: MPB||MPA||$R_B$||$R_A$||C||$m_K$ (MPB||MPA||$R_B$||$R_A$||C)

Including $R_A$ in the message allows A to determine this is indeed a response to its earlier message 1. Including C in the message allows A to verify B's parameter value selection matches its own. The message integrity code $m_K$ (MPB||MPA||$R_B$||$R_A$||C) prevents an attacker from changing a value without detection.

Mesh point A similarly generates message 4 (a Confirm message), to confirm its decision of C. Including both $R_B$ and $R_A$ in the message 4 allows mesh point B to verify that it is a fresh response. This Confirm message is sent as A→B: MPA||MPB||$R_A$||$R_B$||C||$m_K$ (MPA||MPB||$R_A$||$R_B$||C).

At the end of the protocol, both mesh point A and mesh point B have committed to use C as the parameter for this link instance between A and B, which enables the independent decision on the agreement of the security policy.

The ordering of parameter values is announced in the Request sent by each mesh point. Once the Request Message is received, the mesh point can make its decision independently based on the overlap of its own list with the received list. In an embodiment, the selection is made on the basis of the order preference indicated by the device with the larger identifier. This protocol allows the mesh points to initiate the protocol simultaneously and independently respond to the Open Message. Furthermore, the mesh points do not depend on any information announced prior to the peer link establishment protocol in order to agree on a parameter value by the finish of this protocol. The protocol can be initiated by any mesh point at any time and reaches the agreement on the security policy using messages reduced in number from other techniques. In an embodiment, a negotiation process may be applied to negotiate a parameter in a peer-to-peer communications architecture stage, where such parameter is not limited to a security policy. The negotiation process may be applied to a wireless mesh network as well as to other networks using peer-to-peer communications.

In various embodiments, a mechanism for negotiating security policy for a peer link that may be applied to a variety of applications. Such a mechanism may achieve agreement on the security policy more efficiently than other published or proposed mechanisms. While other techniques exchange a number of messages based on the number of choices during the negotiation communicated back and forth, embodiments described herein use a number of message exchanges that is independent on the length of choice lists. In addition, various embodiments also provide security against message forgery and replay attacks. Embodiments providing mechanism to negotiate security policy for secure peer links in a mesh may be applied for mesh networks in home, small office, other consumer spaces, and other wireless and non-wireless applications. Such mechanisms that provide for independent decision making at mesh points in negotiation processes may enhance the ability of client-type devices to participate in self-configuring mesh networks.

In various embodiments, the designs discussed herein may be applied in peer-to-peer negotiation schemes in other contexts to provide enhanced efficiency in a robustness manner and to address issues of message forgery and replay attacks. Negotiating security policy in the peer-to-peer environment as discussed herein may be provided without relying on partner information announcement prior to the peer link establishment protocol. Ordered identifiers between peer-to-peer parties and at least a 4 message session establishment may be applied to negotiate policies, other than security policies, that can be described as lists of overlapping choices.

Figure 5:
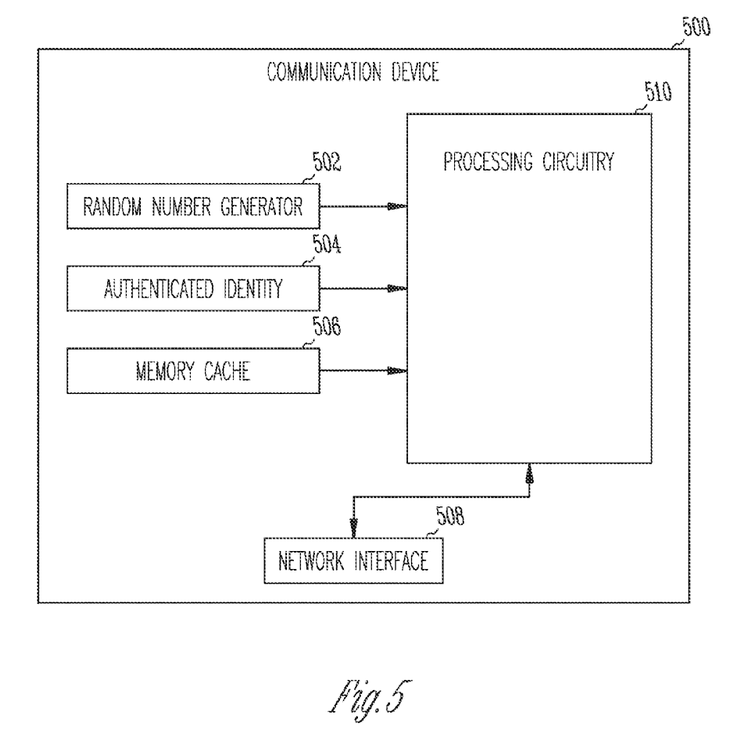
FIG. 5 shows a block diagram of an embodiment of a wireless communication device in accordance with various embodiments to negotiate policy parameters in a peer-to-peer link.

FIG. 5 shows a block diagram of an embodiment of a wireless communication device 500 in accordance with various embodiments to negotiate policy parameters in a peer-to-peer link. Communication device 500 may be arranged as a mesh point similar to those discussed with respect to FIGS.

1-4. Communication device 500 includes a random number generator 502, an authenticated identity 504, memory cache 506, network interface circuitry 508, and processing circuitry 510. With each occurrence of communication device 500 as a mesh point in a mesh network, communication 500 maintains a state having its own set of characteristics.

A node A of FIG. 1 in a mesh network such as that of FIG. 2 operating in an embodiment as discussed with respect to FIGS. 3 and 4 may be realized as including communication device 500, here referenced as communication device A. A node B of FIG. 1 in a mesh network such as that of FIG. 2 operating in an embodiment as discussed with respect to FIGS. 3 and 4 may be realized as including communication device 500, here referenced as communication device B. Communication device A includes authenticated identity 504 (MPA) that is uniquely defined in the mesh network and memory cache 506 that includes mesh point A's session keys (Ks) and ciphersuite list $L_A$. Communication device B includes authenticated identity 504 (MPB) that is uniquely defined in the mesh network and memory cache 506 that includes mesh point B's session keys (Ks) and ciphersuite list $L_B$.

Processing circuitry 510 may be used to conduct a three phase policy negotiation for the establishment of a peer-to-peer link between mesh A and mesh B in the mesh network similar to the process discussed with respect to FIGS. 3 and 4. Processing circuitry 510 of each of communication device A and communication device B may operate to control transmission of a request that includes its unique identity, a random number generated by its random number generator 502, its message integrity code associated with the shared authentication key, and its ciphersuite list. Processing circuitry 510 of each of communication device A and communication device B may also operate to select mesh point A or mesh point B as the "preferred party" using a predetermined rule applied to MPA and MPB. Processing circuitry 510 of each of communication device A and communication device B may also operate to use the "preferred party" and a rule set to select, from the analysis of its ciphersuite list and the ciphersuite list received from the other party, a value as the negotiated value for the policy. Processing circuitry 510 of each of communication device A and communication device B may also operate to transmit its independently determined negotiated parameter to the other party, to receive a negotiated parameter independently determined by the other communication device, and to determine if the negotiation was successful.

In a wireless embodiment, network interface circuitry 508 may be coupled with one or more antennas for use in communicating with other network devices. In a wireline embodiment, network interface circuitry 508 may be coupled with wired and/or wireline communication elements (e.g., wires, cables, busses, and/or other transmission medium).

Although communication device 500 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. The functional elements of communication device 500 may refer to one or more processes operating on one or more processing elements.

Various embodiments may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (for example, a computer). A machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

Communication device 500 may communicate using a variety of techniques. In various embodiments, communication device 500 may communicate orthogonal frequency division multiplexed (OFDM) communication signals over a multicarrier communication channel. The multicarrier communication channel may be within a predetermined frequency spectrum and may comprise a plurality of orthogonal subcarriers. The multicarrier signals may be defined by closely spaced OFDM subcarriers. Communication device 500 may communicate in accordance with a multiple access technique, such as orthogonal frequency division multiple access (OFDMA). In communication device 500 may communicate using spread-spectrum signals.

In various embodiments, communication device 500 may be realized as a portable wireless communication device, such as a personal digital assistant (PDA), a laptop or portable computer with wireless communication capability, a web tablet, a wireless telephone, a wireless headset, a pager, an instant messaging device, a digital camera, a television, a medical device, or other device that may receive and/or transmit information wirelessly.

Figure 6:
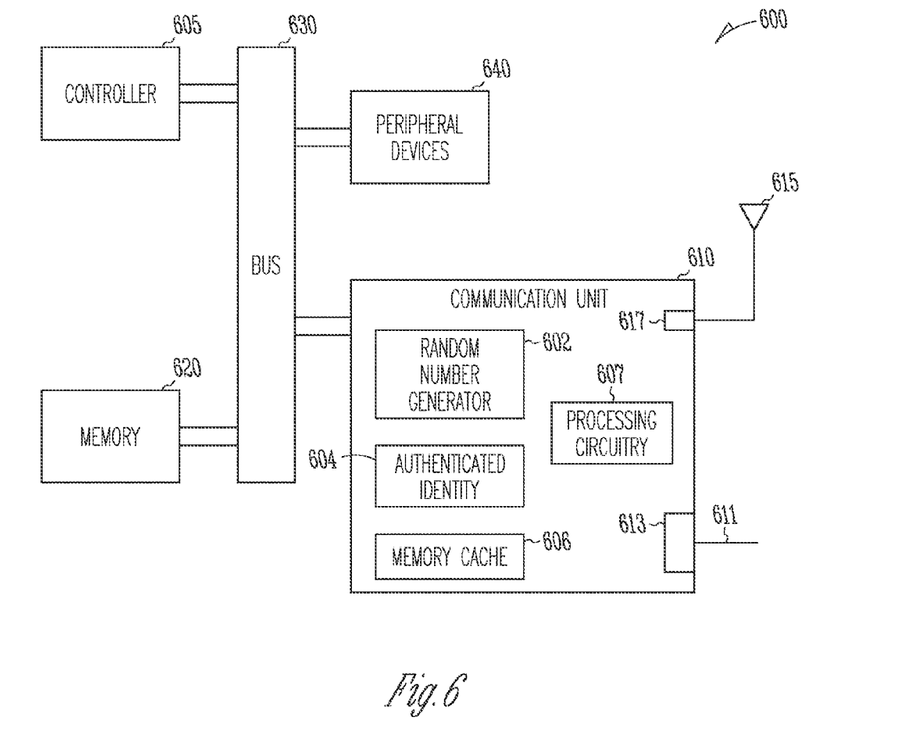
FIG. 6 illustrates a block diagram of an embodiment of a system in accordance with various embodiments to negotiate policy parameters in a peer-to-peer link.

FIG. 6 illustrates a block diagram of an embodiment of a system in accordance with various embodiments to negotiate policy parameters in a peer-to-peer link. FIG. 6 illustrates a block diagram of an embodiment of a system 600 having an embodiment of a communication unit 610 to negotiate a policy in the establishment of a peer-to-peer communication link according to an embodiment has discussed with respect to FIGS. 1-5. Communication unit 610 may be realized with a hardware architecture, a software based architecture, or combination of hardware/software architecture. Communication unit 610 may include a random number generator 602, an authenticated identity 604, a memory cache 606, and processing circuitry 607. Alternatively, one or more of random number generator 602, authenticated identity 604, memory cache 606, and processing circuitry 607 may be implemented in other elements of system 600 or among other elements of system 600.

System 600 may also include a controller 605 and a bus 630, where bus 630 provides a communication path between controller 605 and a communication unit 610. In an embodiment, controller 605 is a processor. Bus 630 may be a parallel bus. Bus 630 may be a serial bus. Bus 630 may be compatible with Peripheral Component Interconnect (PCI) or with PCI express. An embodiment, system 600 may include a memory 620 and an additional peripheral device or devices 640 coupled to bus 630. Peripheral devices 640 may include one or more displays, alphanumeric input devices, cursor controls, memories, or other control devices that may operate in conjunction with controller 605, communication unit 610, and/or elements of communication unit 610.

Various embodiments for system 600 may be realized. System 600 may be arranged as a node, or a component of a node, in a network. A network node may be realized as a mesh point in a mesh network. The mesh network may be a wireless mesh network.

Communication unit 610 may include one or more network interfaces. In a wireless embodiment, communication unit 610 may include a connection 617 to couple to an antenna 615. In various embodiments, antenna 615 may comprise one or more directional or omnidirectional antennas, including, for example, dipole antennas, monopole antennas, patch antennas, loop antennas, microstrip antennas, or other types of antennas suitable for transmission of radio frequency (RF) signals. In various multiple-input, multiple-output (MIMO) embodiments, two or more antennas may be used. In various embodiments, instead of two or more antennas, a single antenna with multiple apertures may be used. Each aperture may be considered a separate antenna. In various multi-antenna embodiments, each antenna may be effectively separated to take advantage of spatial diversity and the different channel characteristics that may result between each of the antennas and another wireless communication device. In various multi-antenna embodiments, the antennas may be separated by up to $1/10$ of a wavelength or more.

In various embodiments, communication unit 610 may include a connection 613 to couple to a transmission medium 611. Transmission medium 611 may be an optical fiber medium. Transmission medium 611 may couple to a wired network. Transmission medium 611 may be cable. Transmission medium 611 may include a coaxial cable, an unshielded twisted pair cable, or a shielded twisted pair cable.

System 600 may include, but is not limited to, information handling devices, wireless systems, telecommunication systems, fiber optic systems, electro-optic systems, and computers, which are structured to include peer-to-peer communications capabilities. Such embodiments may be used with an Ethernet channel, including a wireless Ethernet channel. The communication channel may be part of a land based communication mesh network or a wireless communication mesh network. Indeed, embodiments of the present invention may well be implemented as part of any wireless system using multi-carrier wireless communication channels (e.g., orthogonal frequency-division multiplexing (OFDM), discrete multi-tone modulation (DMT), etc.), such as may be used within, without limitation, a wireless personal area network (WPAN), a wireless local area network (WLAN), a wireless metropolitan are network (WMAN), a wireless wide area network (WWAN), a cellular network, a third generation (3G) network, a fourth generation (4G) network, a universal mobile telephone system (UMTS), and similar communication systems.

Although specific embodiments have been illustrated and described herein, it will be appreciated by those of ordinary skill in the art that any arrangement that is calculated to achieve the same purpose may be substituted for the specific embodiments shown. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description.

What is claimed is:

1. A method comprising:
generating a first request message from a first party to a second party, the first request message including an identifier of the first party, an identifier of the second party, and a ciphersuite list of the first party, the ciphersuite list containing parameters supported by the first party and arranged as an ordered list;
receiving a second request message from the second party, the second request message including the identifier of the second party, the identifier of the first party, and a ciphersuite list of the second party, the ciphersuite list of the second party containing parameters supported by the second party and arranged as an ordered list; and
selecting a parameter from a comparison of the ciphersuite list of the first party and the received ciphersuite list of the second party, the selection using a rule in which the identifiers of the two parties determine the selection, the selected parameter being a negotiated parameter of a policy in establishment of a peer-to-peer communication link between the first party and the second party, wherein using the rule in which the identifiers of the two parties determine the selection includes using identifiers for the two parties that are ordered such that the selection of the parameter is determined by the party having the larger identifier, the selected parameter chosen as a parameter most preferred, by the party having the larger identifier, from an intersection of the ciphersuite lists of parameters of the first party and the second party.

2. The method of claim 1, wherein:
generating the first request message includes sending a random number generated by the first party along with the identifier of the first party, the identifier of the second party, the ciphersuite list of the first party, and a first message integrity code computed by an authentication key, shared by the first party and the second party, over content of the first request message; and
receiving the second request message includes receiving a random number generated by the second party along with the identifier of the second party, the identifier of the first party, the ciphersuite list of the second party, and a second message integrity code computed by the authentication key, shared by the first and the second party, over content of the second request message.

3. The method of claim 2, wherein the method includes transmitting a confirm message to the second party, the confirm message including the selected parameter along with the random number generated by the second party, the random number generated by the first party, the identifier of the first party, the identifier of the second party, and a third message integrity code computed by the authentication key shared by the first and the second party over content of the confirm message.

4. The method of claim 3, wherein the method includes using the random numbers to provide security against replay attacks.

5. The method of claim 1, wherein the method includes using a first MAC address for the first party as the identifier of the first party and a second MAC address for second party as the identifier of the second party.

6. The method of claim 1, wherein the method includes conducting the negotiation as a negotiation of a security policy in a wireless mesh network.

7. The method of claim 6, wherein conducting the negotiation includes conducting the negotiation using four messages, if reception of the messages is errorless.

8. An apparatus comprising:
a memory cache to store a session authentication key and a ciphersuite list of parameters of a policy supported by the apparatus;
an authenticated identity; and
processing circuitry to control negotiation of the policy in establishment of a peer-to-peer communication link with another device including selection of a parameter as a negotiated parameter of the policy, the selection of the parameter derived from a comparison of the ciphersuite list with a ciphersuite list received from the other device in a message containing the ciphersuite list of the other device and an authenticated identity of the other device, the selection based on a rule in which the authenticated identities determine the selection, wherein the rule includes application of the authenticated identities for the apparatus and the other device that are ordered such that the selection of the parameter is determined by one of the apparatus and the other device having the larger authenticated identity, the selected parameter chosen as a parameter most preferred, by the one having the larger identity, from an intersection of the ciphersuite lists of parameters of the apparatus and the other device.

9. The apparatus of claim 8, wherein the apparatus includes a random number generator to generate a random number to include in a message to the other device along with its authenticated identity, the authenticated identity of the other device, and its ciphersuite list and the processing circuitry is configured to determine if a received message is a replay based on the random number.

10. The apparatus of claim 8, wherein the authenticated identity is a MAC address.

11. The apparatus of claim 8, wherein apparatus includes a portable device arranged to communicate wirelessly.

12. The apparatus of claim 8, wherein the apparatus includes a machine-readable medium that stores instructions, which when performed by the processing circuitry, cause the apparatus to:
  generate a first request message to the other device, the first request message including the authenticated identity, the authenticated identity of the other device, and the ciphersuite list;
  process a second request message received from the other device, the second request message including the authenticated identity of the other device, the authenticated identity of the apparatus, and the ciphersuite list of the other device; and select the parameter.

13. The apparatus of claim 12, wherein the processing circuitry includes a digital signal processor.

14. A system comprising:
  a memory to store a session authentication key and a ciphersuite list of parameters of a policy supported by the system;
  an authenticated identity;
  processing circuitry to control negotiation of the policy in establishment of a peer-to-peer communication link with another system including selection of a parameter as a negotiated parameter of the policy, the selection of the parameter derived from a comparison of the ciphersuite list with a ciphersuite list received from the other system in a message containing the ciphersuite list of the other system and an authenticated identity of the other system, the selection based on a rule in which the authenticated identities control the selection; and a substantially omnidirectional antenna to communicate with the other system, wherein:
  the system includes a random number generator to generate a random number to include in a message to the other system along with its authenticated identity, the authenticated identity of the other system, and its ciphersuite list, the processing circuitry to determine if a received message is essentially a replay based on the random number; and
  the rule includes application of the authenticated identities for the system and the other system that are ordered such that the selection of the parameter is determined by one of the system and the other system having the larger authenticated identity, the selected parameter chosen as a parameter most preferred, by the one having the larger identity, from an intersection of the ciphersuite lists of parameters of the system and the other system.

15. The system of claim 14, wherein the authenticated identity is a MAC address.

16. The system of claim 14, wherein processing circuitry includes circuitry to provide security against message forgery based on the authentication key being a shared authentication key with the other system.

17. The system of claim 14, wherein the system includes a wireless system to establish the peer-to-peer communication link in a wireless mesh network.

* * * * *